July 27, 1954 — E. H. SHAFF — 2,684,698
TOOL FOR RUNNING THREADED FASTENING ELEMENTS
Filed June 1, 1950 — 2 Sheets-Sheet 1
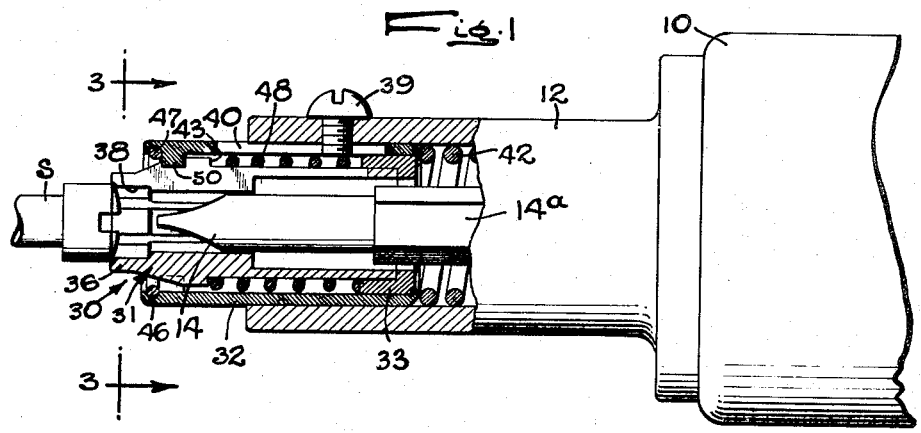
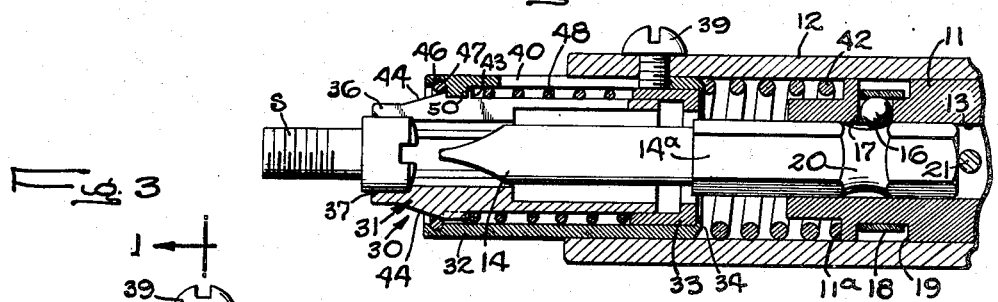
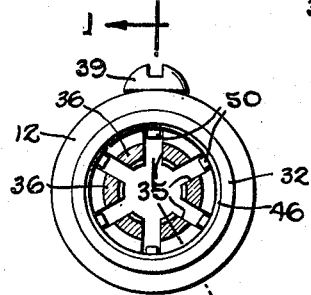
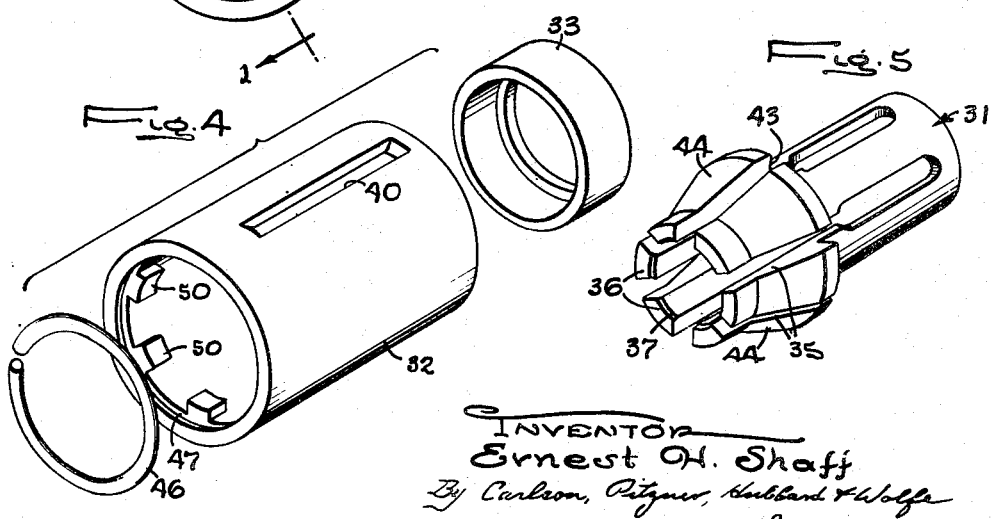
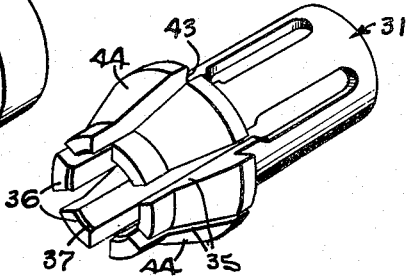
INVENTOR
Ernest H. Shaff
By Carlson, Pitzner, Hubbard & Wolfe
ATTORNEYS July 27, 1954
E. H. SHAFF
2,684,698
TOOL FOR RUNNING THREADED FASTENING ELEMENTS
Filed June 1, 1950
2 Sheets-Sheet 2
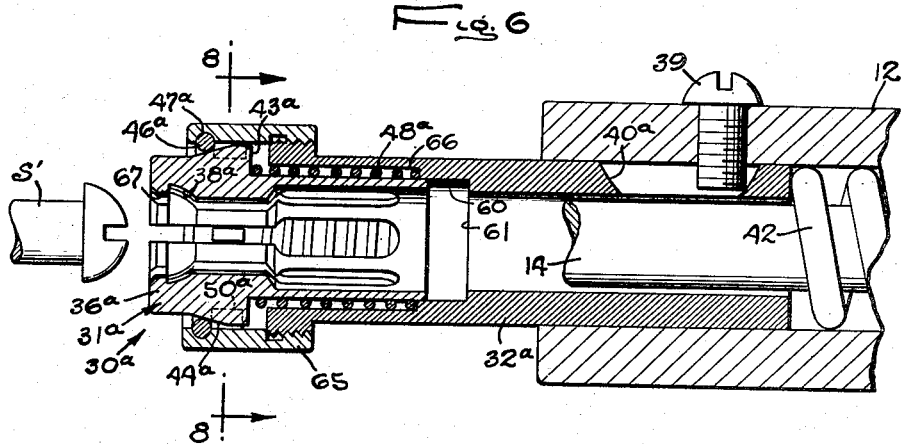
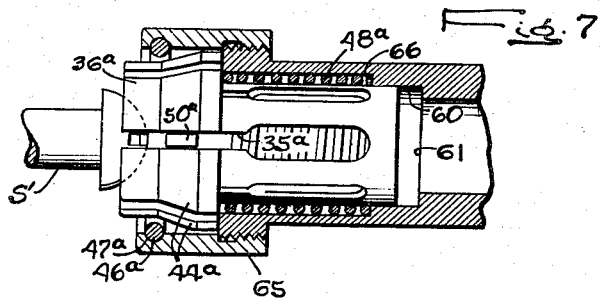
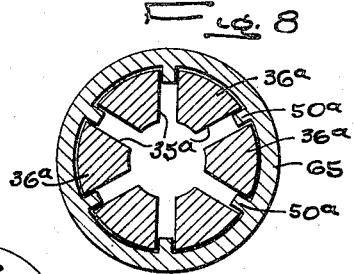
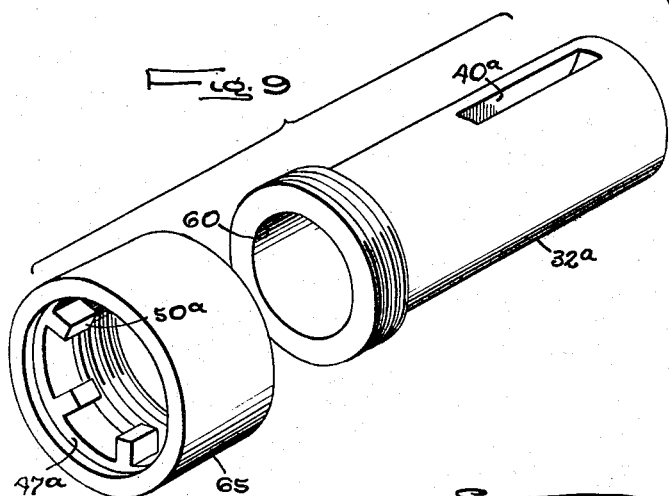
INVENTOR
Ernest H. Shaff
By Carlson, Pitzner, Hubbard & Wolfe
ATTORNEYS

Patented July 27, 1954

2,684,698

UNITED STATES PATENT OFFICE 2,684,698

TOOL FOR RUNNING THREADED FASTENING ELEMENTS

Ernest H. Shaff, Hamilton, Ind., assignor to Keller Tool Company, Grand Haven, Mich., a corporation of Michigan Application June 1, 1950, Serial No. 165,454

2 Claims. (Cl. 144—32)

The present invention relates to portable power operated tools of the type used for driving or running threaded fastening elements such as screws, and has particular reference to an improved finder for picking up and retaining machine screws for application to a workpiece.

This application is a continuation-in-part of my copending application Serial No. 80,954, filed March 11, 1949, now abandoned.

The primary object of the present invention is to provide a finder which is not only operative to grip a fastening element to hold the element firmly in axial alinement with the tool in which the finder is incorporated and to readily release the element while it is being driven, but which also effectually resists any damage that would result from catching or jambing of a fastening element therein.

A more specific object of the invention is to provide in a finder of the above character a spring-biased, cam actuated device for gripping a screw, together with means for preventing rotation of the gripping device which at the same time guides and supports the device so as to prevent dislocation and breakage thereof should a burr or the like on the screw be engaged as the screw is driven.

The objects of the invention thus generally set forth, together with other objects and ancillary advantages, are attained by the construction and arrangement shown by way of illustration in the accompanying drawings, in which:

Figure 1 is a fragmentary sectional view taken in intersecting planes, as indicated by line 1—1 in Fig. 3, through a portable power operated tool in which the present invention is incorporated and illustrating component relationships as a machine screw is about to be inserted in the finder.

Fig. 2 is a fragmentary section similiar to Fig. 1, but illustrating the relation of the parts when a screw is held in the finder.

Fig. 3 is a fragmentary transverse section taken substantially in the plane of line 3—3 in Fig. 1.

Fig. 4 is an exploded perspective view of the finder sleeve and associated elements.

Fig. 5 is a perspective view of the finder collet.

Fig. 6 is a fragmentary longitudinal section similar to Fig. 1, but showing a modified form of the invention and illustrating parts relationship prior to inserting a screw in the finder.

Fig. 7 is a fragmentary view like Fig. 6, but illustrating the relation of the parts as a screw is about to be inserted in the finder.

Fig. 8 is a transverse section taken substantially in the plane of line 8—8 in Fig. 6.

Fig. 9 is an exploded perspective view of the sleeve of the modified finder.

While the invention is susceptible of various modifications and alternative constructions, there is shown in the drawings and will herein be described in detail the preferred embodiments, but it is to be understood that it is not thereby intended to limit the invention to the specific forms disclosed, but it is intended to cover all modifications and alternative constructions falling within the spirit and scope of the invention as expressed in the appended claims.

As illustrated in the drawings, the exemplary forms of the invention are shown embodied in a portable power-actuated screw driver comprising an elongated generally cylindrical main housing 10 having a motor therein for driving a spindle 11 through the medium of speed reduction gearing and clutch means (not shown) if desired. Projecting forwardly from the housing 10 is a barrel 12 in which the spindle 11 is journaled. The spindle has a bore 13 extending axially therethrough and adapted to receive a screw driver bit 14, and for this purpose the forward end of the bore is of hexagonal form for the reception of the complementarily shaped bit shank 14a.

Adjacent its forward end the spindle 11 is provided with detent means for holding the bit 14 in place. As shown, the detent means includes a ball 16 which is disposed in a transverse passage 17 in the spindle 11 and which is resiliently urged to extend partly into the bore 13 by means of a spring band 18 received in a circumferential groove 19 in the spindle. To coact with the ball detent 16, the bit shank 14a is provided with an arcuate circumferential groove 20. Rearward movement of the bit with respect to the spindle is limited by a transversely disposed stop pin 21.

Mounted in the forward end of the barrel 12 and operative to seize a screw or other fastening element and to hold the same in proper position for driving by the bit 14, is a finder generally designated 30. In accordance with the invention, this finder is not only constructed to facilitate the reception of a fastening element for holding the element firmly in an axially alined position for the driving operation, but at the same time it is especially constructed to resist breakage and particularly bending of parts of the finder during the driving operation. Further, the arrangement is such that during the driving operation free rotation of the fastening element in the finder obtains, the finder itself being held stationary so as to prevent scoring of the workpiece.

In general, the finder comprises a gripping device of the collet type together with a spring-actuated cam means in an arrangement such that as an incident to the application of a force in an axial direction to the end of the collet by the head of a screw or the like, the device is capable of yielding to permit easy insertion of the screw head and, upon release of such axial force, the collet is contracted by the spring-actuated cam means so as to grip and firmly hold the screw head in axial relation to the tool and thus in position for engagement by the bit 14.

More particularly as shown in Figs. 1–5, inclusive, the finder comprises a one-piece collet 31 mounted of tubular form for axial movement in a sleeve 32 which is slidably mounted within the forward end of the barrel 12, the collet and sleeve being maintained in axial relation by means of a ring 33. The latter is held stationary within the sleeve 32 which may be done simply by staking as at 34. The collet 31 is provided with longitudinally disposed slots 35 so as to form a peripherally arranged series of spaced, normally expanded, resilient gripping fingers 36. At its forward end the collet is provided with a recess 38 for the reception of the head of a screw S. While as illustrated in Figs. 1–5, inclusive, the screw S is of the fillister head type and the recess 38 is shaped to conform thereto, it is apparent that the recess can be fashioned to accommodate other forms and shapes of fastening elements. In this instance the cylindrical form of the head of the screw S and of the recess 38 serves to maintain axial alinement of the screw.

Preferably the finder sleeve 32 is constrained against rotation, and in the present instance this is accomplished by means of a screw 39 fixed adjacent the forward end of the barrel 12 and received in a longitudinally extending slot 40 in the sleeve 32. The sleeve is normally urged outwardly by means of a spring 42 interposed between a shoulder 11a adjacent the end of the spindle 11 and the retainer ring 33.

Spring-actuated cam means is provided to urge the fingers 36 toward closed position. Thus adjacent its forward end each finger is formed with an arcuate wedge-shaped cam surface 44 which is adapted to coact with a cam surface carried by the sleeve 32. In the illustrative embodiments the latter cam surface is provided by a snap ring 46 disposed in the manner of an internal annular flange at the forward end of the sleeve 32 and maintained in place by its reception in an annular groove 47 formed in the sleeve 32. To permit coaction of the cam surfaces 44 and the snap ring 46, the collet 31 has relative axial movement within the sleeve 32. Such movement in a rearward direction is limited by engagement of the inner end of the collet with the retainer ring 33.

Forward movement of the collet with respect to the sleeve is effected by an expansion type spring 48 interposed between the retainer ring 33 and the rear end faces 43 of the cam shoulders 44. Thus the collet is normally urged forwardly by the spring 48 so that the cam surfaces coact with the snap ring 46 to force the gripping fingers 36 inwardly, thereby causing the recess 38 to be reduced to a diameter slightly smaller than the head of the screw S which is to be picked up by the finder.

To pick up a screw for application to a workpiece, the recess 38 is brought into alinement with the screw head and upon pressing the tool toward the screw the collet is urged rearwardly against the action of the spring 48. Thus the tapered cam surfaces 44 are moved rearwardly with respect to the snap ring 46, thereby permitting the resilient fingers 36 to open and the screw head to enter the recess 38. To assist entry of the screw head into the recess, the inner forward edges of the fingers 36 are beveled slightly as at 37 (Fig. 5). Immediately upon withdrawal of the tool the collet 31 is again urged forwardly by the action of the spring 48 and, as a result of the coaction of the cam surfaces 44 with the snap ring 46, the fingers 36 are urged toward each other to grip the screw head and thus retain the screw (Fig. 2) for presentation to a workpiece.

The blade of the screw driver bit 14, while entering the finder 30 normally terminates short of the collet recess 38. As an incident to pressing the screw against the work, the tool is moved forwardly relative to the finder thereby compressing the spring 42 and bringing the blade of the bit 14 into engagement with the screw head.

Upon such forward movement of the tool the barrel 12 moves forwardly relative to the finder 30, and the snap ring 46 is also moved forwardly with respect to the cam surfaces 44. Consequently, the resilient fingers 36 are permitted to expand, thereby freeing the screw head for rotation by the bit 14.

It has been found through practical experience that most machine screws have one or more burrs left on the screw head, usually as a result of the cutting operation in forming the kerf or slot therein. Commonly these burrs project outwardly from the side of the screw head. Consequently, as the screw is being driven the burr, which rotates with the screw and relative to the spring fingers 36, tends to catch in the slots 35 and on the edges of the fingers 36, applying a lateral or circumferentially directed force thereto which is liable to break the fingers or bend them out of shape.

To overcome this difficulty, therefore, means is provided to support the fingers against the application of such lateral force as to prevent the fingers from becoming broken or bent out of shape should a burred screw head be encountered. To this end the finder includes lateral abutments for each of the fingers 36. Thus, in the present instance, the sleeve 32 is provided with an annularly arranged series of longitudinally disposed keys or splines 50 which, as shown, are integrally formed with the sleeve adjacent the forward end thereof, and are disposed rearwardly of the snap ring recess 47. The keys 50 are arranged for coaction with the slots 35 of the collet 31 and therefore correspond in number to the slots and fingers 36.

To permit unhindered movement of the fingers 36 toward each other in response to the cam action of the shoulders 44 and snap ring 46, the keys 50 are made of a width slightly less than that of the slots 35. By way of example, a key of 0.050 inch with a finger spacing or slot width of 0.0625 inch has been found satisfactory in a finder for seizing conventional #10 fillister head machine screws.

To facilitate assembly of the finder and the interchange of collets so as to accommodate different sizes or shapes of fastening elements, the sleeve 32 and the keys 50 are formed to provide sufficient clearance to permit insertion of the collet 31 by way of the forward end of the sleeve. All that is necessary to accomplish these ends is to remove the snap ring 46 from the sleeve groove 47, and when inserting the collet to see that it is properly oriented to permit entry of the keys 50 in the slots 35 between the cam shoulders 44. Replacement of the snap ring serves to maintain the assembled relation of the parts.

This construction also permits screw driver bits to be readily changed, if desired, without need for removal of the entire finder. To accomplish this the snap ring and collet only need be removed and the sleeve 32 pressed rearwardly to expose the forward end of the screw driver blade 14a so that it can be grasped and pulled outwardly to disengage the detent 16. That this feature is advantageous is immediately apparent when it is considered that it will usually be desirable to change the screw driver bit at the time that the collet, too, is changed in order to accommodate a different size of fastening element.

Turning now to Figs. 6–9 inclusive, there is shown another form of the present invention which is intended primarily for the accommodation of screws or other fastening elements having the portion thereof to be engaged by the finder of a diameter too large to be received within the finder collet and still have the collet of a size to be accommodated within the finder sleeve and the sleeve within the barrel 12 of the tool.

In the following description parts corresponding to those in the preceding embodiment are denoted by like reference numerals with the letter $a$ suffixed thereto.

The modified finder generally designated 30a includes a collet 31a mounted for axial movement in a sleeve 32a which, in turn, is axially slidable in the forward end of the barrel 12. The sleeve is retained in the end of the barrel and is constrained against rotation by the screw 39 which is received in a longitudinal slot 40a in the sleeve adjacent its inner end. To receive the inner end of the collet 31a the sleeve 32a is counterbored as at 60 and the annular shoulder 61 at the inner end of the counterbore 60 serves to limit rearward axial movement of the collet within the sleeve 32a.

The collet 31a is provided with longitudinally disposed slots 35a which, as shown, extend from its outer end for almost the full length of the collet, thereby forming gripping fingers 36a. The outer or forward end of the collet is provided with a recess 38a for the reception of the head of a screw S'. As illustrated, the recess 38a is of generally hemispherical shape to accommodate roundhead screws.

The spring actuated cam means provided to urge the fingers 36a toward closed position is much the same as that for the other species of the invention illustrated. It includes arcuate wedge-shaped cam surfaces 44a rigid with the fingers 36a which are adapted to coact with a second cam surface which is fixed with respect to the sleeve 32a. As before, the latter cam surface is preferably provided by a smooth hardened snap ring 46a which is received in an annular groove 47a in an end ring 65 which, as shown, is threaded on the outer end of the sleeve 32a.

The cam surfaces 46a and 44a are urged into engagement to normally move the fingers toward each other by means of an expansion type spring 48a. The spring 48a is disposed about the collet 31a and received in the outer end of the counterbore 60 which is enlarged for the purpose. The spring 48a acts between the rear faces 43a of the cam shoulders 44a and the internal shoulder 66 at the inner end of the enlarged portion of the counterbore 60.

To assist in the retention of such roundhead screws, such as the screw S' or other similarly shaped fastening elements, the tip of each of the fingers 36a is provided with an inwardly extending arcuate shoulder 67 which is adapted to slip under the screw head upon its insertion in the recess 38a. An inward extension of the shoulder 67 on the order of .005 inch has proved satisfactory in collets for picking up #12 and one-quarter inch roundhead screws.

With round, oval or other similarly headed screws, considerable difficulty has been experienced in the past in maintaining them in axially alined relation with the tool for presentation to the work. This difficulty is obviated by the present construction of the finder. When a screw head like that of the screw S' is received in the recess 38a, the tips or shoulders 67 of the fingers are pressed under the edge of the screw head all around its periphery under the force of the coacting cam surfaces 44a and 46a. This not only serves to retain the screw in the recess, but also operates to hold it against skewing so that it can be presented squarely to the work.

In the instant form of the invention the means provided to support the fingers 36a against the application of a lateral force that would occur if a burr or the like on the head of the screw S' was encountered comprises an annularly arranged series of splines or keys 50a. As shown, the keys 50a are formed integrally with the end ring 65 immediately behind the snap ring recess 47a. The keys 50a, as before, are arranged for coaction with the slots 35a, and thus correspond in number to the slots and fingers 36a.

This form of the invention may be assembled in much the same way as the previous form illustrated. If desired, however, a slightly different method can be used: With the spring 48a in place on the collet 31a the latter can be slipped into the end of the sleeve 32a and held in a rearward position against the action of the spring 48a while the end ring 65 with the snap ring 46a in place therein is threaded onto the outer end of the sleeve 32a. The assembled finder is then applied to the barrel 12 with the bit 14 extending into the sleeve 32a, and it is retained in place by the screw 39a.

It will be appreciated that in either of the illustrative embodiments of the invention the relative location of the splines or keys 50 or 50a and the cam shoulders 44 or 44a, causes lateral support for the fingers to be provided and, further, such support is closely adjacent the recess 38 or 38a where the fingers will be engaged by a burr or other imperfection on the screwhead and thus adjacent the point of greatest finger strain.

From the foregoing it is apparent that a finder incorporating the features of the present invention is operative to seize a screw or other fastening element, to hold the same in axial alinement for presentation to a workpiece and to release the element for free rotation during the driving operation. Should a burred fastening element be encountered, the supporting means provided effectually prevents damage to the gripping fingers of the finder, for in use, engagement therewith of a burr results either in shearing off the burr or possibly in stalling the tool in which the finder is installed.

Furthermore, the supporting means while permitting axial movement of the collet with respect to the sleeve at the same time holds the collet non-rotative, thereby preventing the scoring of an objectionable ring on the work about the fastening element as it is driven.

I claim as my invention:

1. In a tool for running fastening elements, a finder for seizing one such element comprising, in combination, a sleeve having an inwardly extending flange at its outer end, a collet axially shiftable within said sleeve and presenting a plurality of gripping fingers each having a tapered shoulder thereon for coaction with said flange to move the same inwardly, a retainer ring fixed with respect to said sleeve and having a portion thereof interposed between said sleeve and collet to maintain said collet coaxially of said sleeve, said ring further presenting an abutment surface engageable by said collet to limit rearward movement of said collet within said sleeve, and a spring disposed about said collet and between said ring and the rear faces of said finger shoulders and operative to normally urge said shoulders into engagement with said flange to cam said fingers toward closed position whereby to grasp the fastening element.

2. In a power actuated tool for running fastening elements having a body terminating at its forward end in a barrel and having a spindle and a driver operatively associated with said spindle projecting forwardly in the barrel, a finder for holding a fastening element for engagement by said driver comprising, in combination, a sleeve axially slidable in said barrel, a hollow collet telescopingly received in said sleeve and having a recessed nose portion slotted to form a plurality of forwardly extending normally expanded resilient gripping fingers for the reception of the fastening element, said sleeve and collet having tapered surfaces engageable upon outward movement of the collet relative to the sleeve for wedging said fingers into gripping engagement with the fastening element, biasing means interposed between said collet and sleeve and normally urging said collet toward its outward position with respect thereto, and a spring interposed between said spindle and said sleeve and operative to bias the finder outwardly in said barrel to normally maintain said driver out of engagement with the fastening element but to permit rearward axial movement of the sleeve with respect to said driver upon application of forward pressure to the tool and to permit driving engagement of the driver and the fastening element such application of forward pressure also producing rearward movement of said collet within said sleeve against the action of said biasing means permitting expansion of said fingers into normal position and release of the fastening element for free rotation within the recessed nose portion of the collet upon running thereof.

References Cited in the file of this patent

UNITED STATES PATENTS

| Number | Name | Date |
|---|---|---|
| 1,383,429 | Russell | July 5, 1921 |
| 2,061,086 | Nord | Nov. 17, 1936 |
| 2,175,299 | Malvin | Oct. 10, 1939 |
| 2,272,279 | Schindel | Feb. 10, 1942 |
| 2,374,558 | Moore | Apr. 24, 1945 |

FOREIGN PATENTS

| Number | Country | Date |
|---|---|---|
| 2,342 | Great Britain | 1903 |
| 722,799 | Germany | July 21, 1942 |